(12) United States Patent
Patil et al.

(10) Patent No.: US 11,012,296 B2
(45) Date of Patent: May 18, 2021

(54) HANDLING UNSOLICITED REQUESTS FROM DEVICES

(71) Applicant: Cisco Technology, Inc., San Jose, CA (US)

(72) Inventors: Santosh Ramrao Patil, Santa Clara, CA (US); Pranathi Mamidi, Gilroy, CA (US); Padumane Kishan, Fremont, CA (US); Swaminathan A. Anantha, Mountain View, CA (US); Madhusudan Nanjanagud, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 16/503,248

(22) Filed: Jul. 3, 2019

(65) Prior Publication Data

US 2021/0006462 A1    Jan. 7, 2021

(51) Int. Cl.
| | |
|---|---|
| *G06F 15/177* | (2006.01) |
| *H04L 12/24* | (2006.01) |
| *H04L 29/06* | (2006.01) |
| *G06F 16/953* | (2019.01) |

(52) U.S. Cl.
CPC ........ *H04L 41/0809* (2013.01); *G06F 16/953* (2019.01); *H04L 63/0876* (2013.01)

(58) Field of Classification Search
USPC ......................................................... 709/222
See application file for complete search history.

(56) References Cited

U.S. PATENT DOCUMENTS

| | | | |
|---|---|---|---|
| 7,444,515 B2 | 10/2008 | Dharmapurikar et al. | |
| 8,606,910 B2 | 12/2013 | Alperovitch et al. | |
| 9,037,729 B2 | 5/2015 | Larkin | |
| 9,179,305 B2 | 11/2015 | Haddad et al. | |
| 9,191,414 B2 | 11/2015 | Larkin | |
| 9,374,373 B1* | 6/2016 | Chan | H04L 9/0819 |
| 9,413,783 B1 | 8/2016 | Keogh | |
| 9,641,561 B2 | 5/2017 | Larkin | |
| 9,807,092 B1* | 10/2017 | Gutzmann | H04L 63/10 |
| 10,387,265 B1* | 8/2019 | Pogosyan | G11C 7/1072 |
| 10,405,150 B2* | 9/2019 | Aiuto | H04W 4/80 |
| 2009/0254663 A1 | 10/2009 | Alperovitch et al. | |

(Continued)

FOREIGN PATENT DOCUMENTS

| | | |
|---|---|---|
| AU | 2009251584 A1 | 12/2009 |
| CN | 102138306 A | 7/2011 |

(Continued)

OTHER PUBLICATIONS

Rao et al., "Incremental Bloom Filters," IEEE INFOCOM 2008, Abstract Only.

*Primary Examiner* — Anthony Mejia
(74) *Attorney, Agent, or Firm* — Patterson + Sheridan, LLP (57) ABSTRACT

Techniques for handling requests from a remote device are disclosed. A server receives a first unsolicited activation request from a first device of a plurality of devices. A probabilistic hash filter, associated with a data set, is queried using a first identifier associated with the first device. In response, a first result is received from the probabilistic hash filter indicating that the first device is not ready for activation. In response to receiving the first result, a back-off indication is transmitted to the first device.

17 Claims, 7 Drawing Sheets

(56) References Cited

U.S. PATENT DOCUMENTS

| | | | |
|---|---|---|---|
| 2010/0318795 | A1 | 12/2010 | Haddad et al. |
| 2012/0084441 | A1 | 4/2012 | Alperovitch et al. |
| 2015/0373691 | A1 | 12/2015 | Turon et al. |
| 2017/0034285 | A1 | 2/2017 | Bhandari et al. |
| 2017/0195318 | A1* | 7/2017 | Liu .......................... H04L 67/10 |
| 2017/0237770 | A1* | 8/2017 | Meriac .................... H04L 67/12 |
| | | | 726/23 |
| 2018/0019983 | A1* | 1/2018 | Tissot ..................... G06F 21/83 |
| 2018/0322314 | A1* | 11/2018 | Kim ....................... G06F 21/602 |
| 2019/0102569 | A1* | 4/2019 | Khandani ........... H04L 63/0869 |
| 2019/0118767 | A1* | 4/2019 | Britt ...................... H04L 67/125 |
| 2019/0268316 | A1* | 8/2019 | Kurian .................. H04L 9/3215 |
| 2019/0268334 | A1* | 8/2019 | Kurian .................. H04L 67/12 |
| 2019/0280867 | A1* | 9/2019 | Kurian .................... H04W 4/70 |
| 2019/0280936 | A1* | 9/2019 | Kurian .................... H04L 41/12 |
| 2020/0145409 | A1* | 5/2020 | Pochuev ............... H04L 63/166 |
| 2020/0167337 | A1* | 5/2020 | Kurian .................. G06Q 10/08 |
| 2020/0293658 | A1* | 9/2020 | Krishna Murthy ....... G06F 8/65 |
| 2020/0344259 | A1* | 10/2020 | Kurupati ............. H04L 63/1466 |

FOREIGN PATENT DOCUMENTS

| | | |
|---|---|---|
| CN | 102550052 A | 7/2012 |
| EP | 2266268 A1 | 12/2010 |
| EP | 2441284 A1 | 4/2012 |
| GB | 2493129 B | 7/2018 |
| GB | 2493130 B | 8/2018 |
| JP | 2012530392 A | 11/2012 |
| KR | 20120020200 A | 3/2012 |
| TW | 201129131 A | 8/2011 |
| WO | 2009146118 A1 | 12/2009 |
| WO | 2010144748 A1 | 12/2010 |

* cited by examiner

HANDLING UNSOLICITED REQUESTS FROM DEVICES

TECHNICAL FIELD

Embodiments presented in this disclosure generally relate to communication networks. More specifically, though not exclusively, embodiments disclosed herein relate to techniques for handling unsolicited requests from remote devices, at a server, over a communication network.

BACKGROUND

In communication networks, central servers are sometimes bombarded with unsolicited, but authorized, requests from remote devices. For example, in Plug and Play (PnP) systems, onboarding servers can be used to facilitate configuration and initial operation of remote devices. These onboarding servers are centrally deployed for devices from a given vendor. For example, onboarding servers can be hosted on a public cloud and accessible over the internet. Remote devices can include a PnP agent that acts, during the initial configuration of the devices, to connect to the remote onboarding servers for day-0 onboarding.

This can result in large numbers of devices (e.g., thousands, or tens of thousands) connecting to the central onboarding servers for day-0 onboarding. But in some circumstances, not all of these devices are ready for onboarding. For example, many of the devices may not have been registered or authorized, and so these devices may not have day-0 configuration information populated at the central onboarding servers. This results in the PnP requests from the remote devices being rejected by the central onboarding servers. Handling of these unsolicited devices onboarding request (e.g., thousands of requests per minute) can lead to significant resource consumption and significant wasted resource use at the onboarding servers.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments described herein include a computerized method for handling requests from a remote device. The method includes receiving, at a server, a first unsolicited activation request from a first device of a plurality of devices. The method further includes querying a probabilistic hash filter, associated with a data set, using a first identifier associated with the first device, and in response receiving a first result from the probabilistic hash filter indicating that the first device is not ready for activation. The method further includes, in response to receiving the first result, transmitting, to the first device, a back-off indication.

Embodiments described herein further include a system, including a processor and a memory containing computer program code that, when executed by the processor, performs an operation. The operation includes receiving, at a server, a first unsolicited activation request from a first device of a plurality of devices. The operation further includes querying a probabilistic hash filter, associated with a data set, using a first identifier associated with the first device, and in response receiving a first result from the probabilistic hash filter indicating that the first device is not ready for activation. The operation further includes, in response to receiving the first result, transmitting, to the first device, a back-off indication.

Embodiments described herein further include a non-transitory computer-readable medium containing computer program code that, when executed by operation of one or more computer processors, performs an operation. The operation includes receiving, at a server, a first unsolicited activation request from a first device of a plurality of devices. The operation further includes querying a probabilistic hash filter, associated with a data set, using a first identifier associated with the first device, and in response receiving a first result from the probabilistic hash filter indicating that the first device is not ready for activation. The operation further includes, in response to receiving the first result, transmitting, to the first device, a back-off indication

EXAMPLE EMBODIMENTS

As discussed above, large numbers of unsolicited requests from remote devices to an onboarding server for day-0 configuration can lead to significant wasted resource consumption. In an embodiment, it is desirable to improve the operation of the onboarding server to decrease this wasted resource consumption. But in an embodiment, these requests are authorized, so known techniques relating to resisting denial of service (DoS) attacks cannot be used. For example, DoS attacks can be resisted by filtering traffic based on region, based on user credentials, using authentication tokens, etc. These techniques are not suitable for decreasing the impact of unsolicited, but authorized, device requests (e.g., from remote devices to an onboarding server as part of day-0 configuration).

Instead, one or more techniques disclosed herein describe use of a probabilistic hash filter to improve the operation of the onboarding server and decrease wasted resource consumption. As one example, an incremental bloom filter can be used. This filter can be used to quickly reject premature device requests, without requiring further database lookups or remote connections. This significantly improves performance of the onboarding server, while also allowing for rapid connection and configuration by the remote devices during day-0 configuration.

While techniques disclosed herein are focused on a PnP environment and onboarding servers, one more techniques are applicable for any large scale system which is handling a high volume of unsolicited connections or traffic. For example, the techniques discloses herein can be applied to Internet of Things (IoT) configuration and connection servers, cloud-managed networking device management systems, and many other suitable systems.

Figure 1:
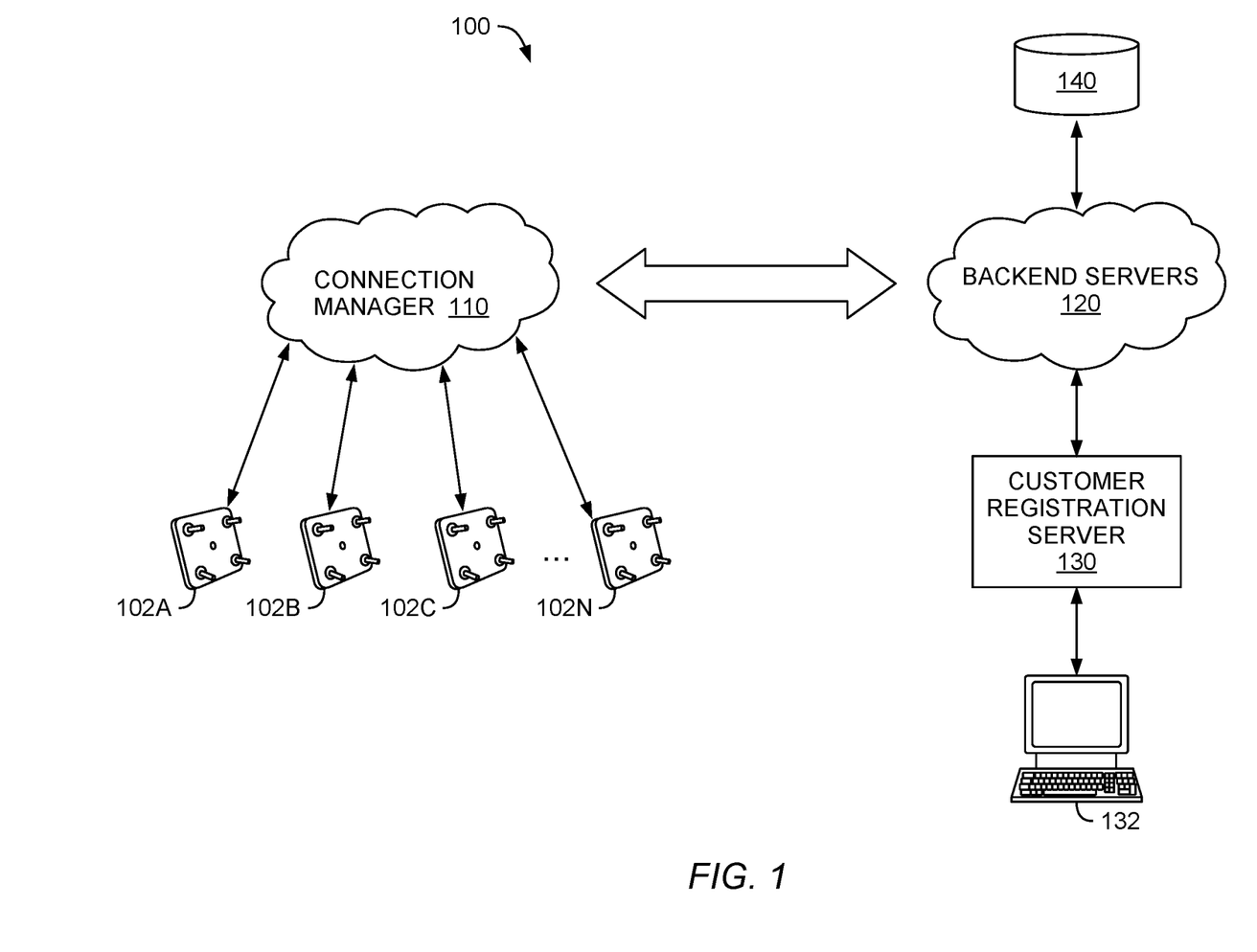
FIG. 1 illustrates a device onboarding environment, according to one embodiment described herein.

FIG. 1 illustrates a device onboarding environment 100, according to one embodiment described herein. In an embodiment, a number of devices 102A-N are configured to use a connection manager 110 for day-0 onboarding. For example, the connection manager 110 can be a central PnP server operating in a public cloud, or an IoT configuration server. Each of the devices 102A-N can include an agent or other software module (e.g., a PnP agent or an IoT activation agent) configured to connect to the connection manager 110 when the devices are first connected to a network.

In one embodiment, the devices 102A-N are network devices (e.g., routers, switches, network access points (APs), etc.) operating an agent configured to connect to the connection manager 110 when the devices are initially connected to a communication network. Alternatively, the devices 102A-N can be any other device configured to connect to the connection manager 110 for day-0 onboarding.

Further, while the devices 102A-N are depicted as separate devices, each of these devices can instead be a software module operating on the same (or different) physical devices. For example, the device 102A can be a first software module (e.g., a software program) operating on a first computer, mobile device, IoT device, etc. The device 102B can be a second software module (e.g., a second software program) operating on the same physical computer, mobile device, IoT device, etc. Or the device 102B can be a second software module operating on a different physical computer, mobile device, IoT device, etc.

The devices 102A-N can connect to the connection manager using any suitable physical connection, including a wired connection, a wireless connection, a cellular connection, etc. Further, the devices 102A-N can connect to the connection manager using any suitable communication network, including the internet, a local area network, a wide area network, a cellular network, etc.

In an embodiment, the connection manager 110 is in communication with one or more backend servers 120. The backend servers 120, as illustrated, can be used to maintain configuration and connection information for the devices 102A-N. For example, a customer computing device 132 (e.g., a computer, mobile phone, tablet, etc.) can connect with a customer registration server 130 to register one or more of the devices 102A-N. In one example, the customer computing device 132 can access a web page or portal associated with the customer registration server, and can use that web page or portal to register the desired devices and to provide any necessary configuration information for the devices. Alternatively, the customer computing device 132 can use a local application (or any other suitable technique) to connect with the customer registration server 130.

In an embodiment, the information provided by the customer computing device 132 is provided to the backend servers 120 and stored in an associated database 140. The connections between the backend servers 120 and the connection manager 110, the database 140, and the customer registration server 130 can be any suitable physical connection, including a wired connection, a wireless connection, a cellular connection, etc. Further, these connections can use any suitable communication network, including the internet, a local area network, a wide area network, a cellular network, etc. The database 140 can be any suitable electronic database, including a relational database.

As one example, a customer may use the customer computing device 132 (e.g., a laptop) to access a web portal associated with the customer registration server 130. The customer may then select to register the device 102A, and provide configuration information for the device 102A to the customer registration server 130. The customer registration server can provide this information to the backend servers 120, which can store the information in the database 140. When the device 102A is first activated (e.g., day-0 activation), it can connect to the connection manager 110. The connection manager 110 connects to the backend servers 120 to seek day-0 configuration information for the device 102A. Because this device 102A has been registered by the customer, the backend servers 120 provide the configuration information to the connection manager 110, which activate the device 102A.

Continuing with this example, assume the device 102B has not been registered by a customer using the customer registration server 130. When the device 102B is first connected a network, it connects with the connection manager 110. The connection manager connects with the backend servers 120. The backend servers 120 respond to the connection manager 110 with a message indicating that the device 102B has not been registered or configured by a customer. The connection manager 110 can respond to the device 110B by, for example, providing a message indicating that the device 102B is not registered, and should wait and try again later for activation.

Figure 2:
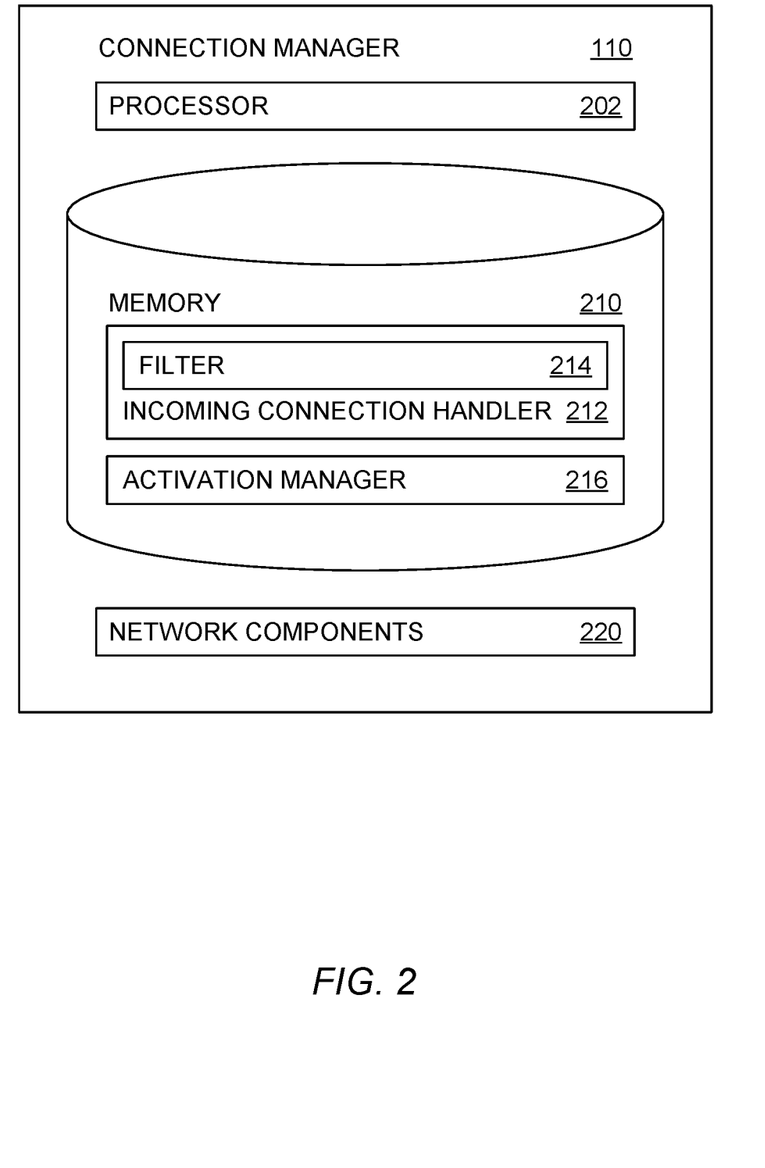
FIG. 2 is a block diagram illustrating a connection manager for a device onboarding environment, according to one embodiment described herein.

FIG. 2 is a block diagram illustrating a connection manager 110 for a device onboarding environment, according to one embodiment described herein. The connection manager 110 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the connection manager 110 to interface with a communication network. For example, the network components 220 can includes network interface components and associated software. Although the memory 210 is shown as a single entity, the memory 210 may include one or more memory devices having blocks of memory associated with physical addresses, such as random access memory (RAM), read only memory (ROM), flash memory or other types of volatile and/or non-volatile memory.

The memory 210 generally includes program code for performing various functions related to use of the connection manager 110. The program code is generally described as various functional "applications" or "modules" within the memory 210, although alternate implementations may have different functions and/or combinations of functions. Within the memory 210, the incoming connection handler 212 handles incoming device requests (e.g., from devices 102A-N illustrated in FIG. 1). In an embodiment, the incoming connection handler 212 includes a filter 214, as discussed further with regard to FIGS. 3-6, below. In an embodiment, the filter 214 is a probabilistic hash filter (e.g., an incremental bloom filter).

A Bloom filter is a probabilistic data structure that can be used to test whether an element is a member of a set. In an embodiment, false positive matches are possible in a Bloom filter, but false negatives are not. For example, a query for an entry in the Bloom filter can return a value signifying that the entry is either in a given set, or not in a given set. A return of "not in set" is guaranteed to be accurate. A return of "in set" is likely, but not guaranteed, to be accurate, resulting in false positive matches. In an embodiment, elements can be added to the set in an incremental bloom filter, but cannot be removed. In general, the more elements added to the set the larger number of false positives. A Bloom filter is merely one example of a probabilistic data structure suitable for filter 214. Other data structures may also be used (e.g., a cuckoo filter or another suitable probabilistic data structure).

The memory 210 further includes an activation manager 216. In an embodiment, the activation manager 216 is configured to handle interaction with backend servers (e.g., the backend servers 120 illustrated in FIG. 1), as discussed further with regard to FIGS. 3-6, below.

Figure 3:
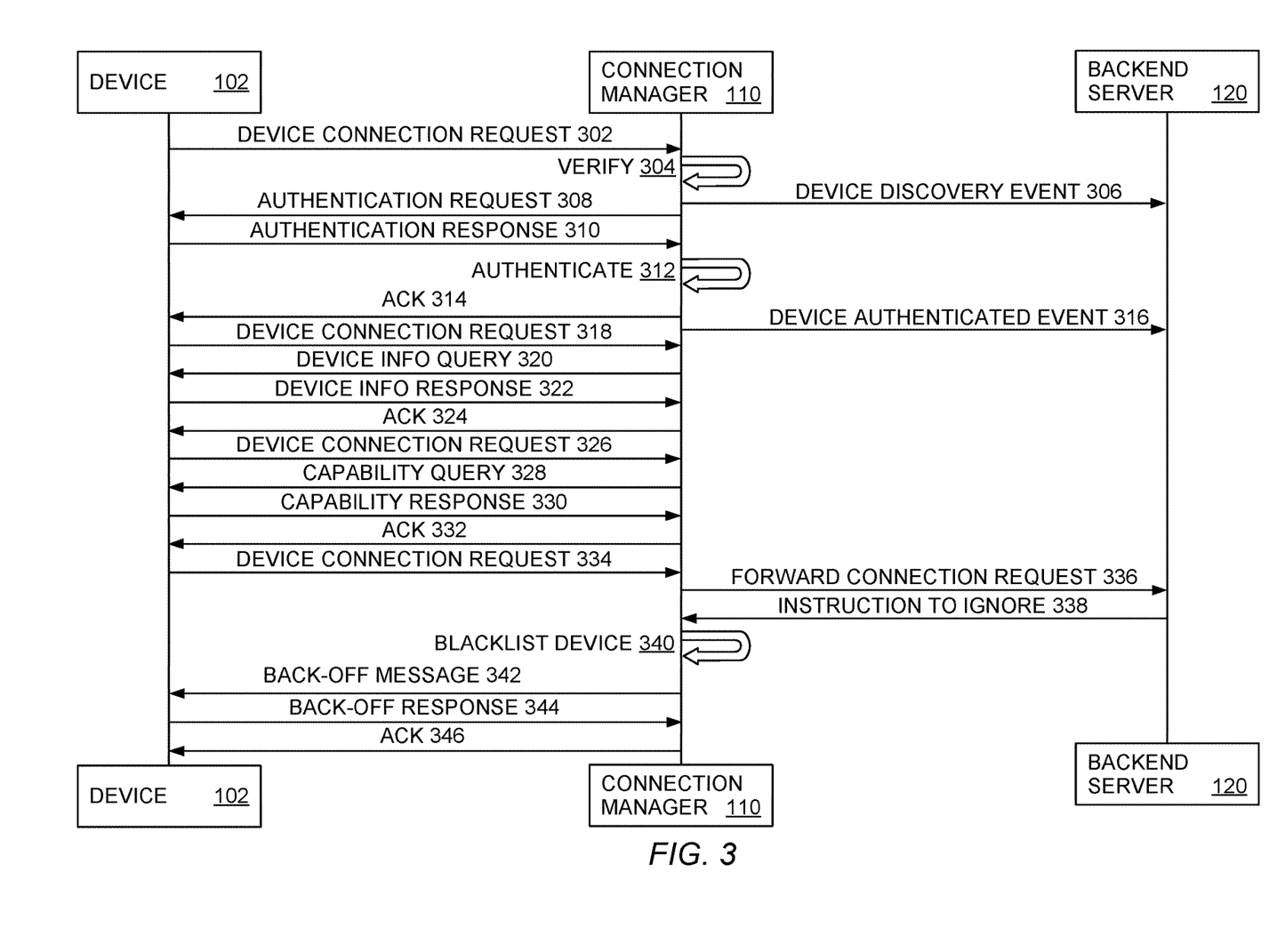
FIG. 3 is a messaging diagram illustrating operation of a connection manager in a device onboarding environment, according to one embodiment described herein.

FIG. 3 is a messaging diagram illustrating operation of a connection manager in a device onboarding environment, according to one embodiment described herein. In an embodiment, FIG. 3 illustrates a device onboarding environment with a connection manager that does not use a probabilistic hash filter as described in connection with FIGS. 4-6, below.

A device 102 (e.g., one of the devices 102A-N illustrated in FIG. 1) transmits a device connection request 302 to a connection manager 110 (e.g., the connection manager 110 illustrated in FIGS. 1 and 2). In an embodiment, the device connection request 302 is an unsolicited activation request from the device 102. For example, the device connection request 302 can be a PnP activation request (e.g., requesting activation for a PnP device). As another example, the device connection request 302 can be an IoT activation request (e.g., requesting activation for an IoT device).

The connection manager 110 verifies the device connection request 302, at phase 304. The connection manager 110 determines that the device connection request 302 is acceptable, and transmits a device discovery event 306 to a backend server 120 (e.g., one or more of the backend servers 120 illustrated in FIG. 1).

The connection manager 110 further transmits to the device 102 an authentication request 308. The device 102 responds to the connection manager 110 with an authentication response 310. The connection manager 110 authenticates the device 102, at phase 312. The connection manager 110 transmits an ack 314 (e.g., an acknowledgment) to the device 102. The connection manager 110 further transmits a device authenticated event 316 to the backend server 120.

After receiving the ack 314, the device 102 transmits a second device connection request 318 to the connection manager 110. The connection manager 110 has now authenticated the device 102, so the connection manager 110 transmits a device info query 320 to the device 102, requesting information about the device 102. The device 102 responds with a device info response 322 to the connection manager 110. The connection manager 110 replies with an ack 324 to the device 102.

The device 102 then transmits a third device connection request 326 to the connection manager 110. The connection manager 110 responds by transmitting a capability query 328 to the device 102. The device 102 transmits a capability response 330 to the connection manager 110, providing information about the capability of the device 102. The connection manager 110 then transmits an ack 332 to the device 102.

The device 102 then transmits a fourth device connection request 334 to the connection manager 110. After this connection request, the connection manager 110 transmits a forwarded connection request 336 to the backend server 120. The backend server 120 determines that the device 102 is not ready for configuration, and responds to the connection manager 110 with an ignore indication (e.g., an instruction to ignore 338). At phase 340, the connection manager 110 blacklists the device 102 to handle future connection request messages.

The connection manager 110 then transmits a backoff message 342 to the device 102, instructing the device 102 to back off from sending further device connection requests (e.g., for a period of time). The device 102 responds by transmitting a backoff response 344 to the connection manager 110. The connection manager 110 concludes by transmitting an ack 346 to the device 102.

Figure 4A:
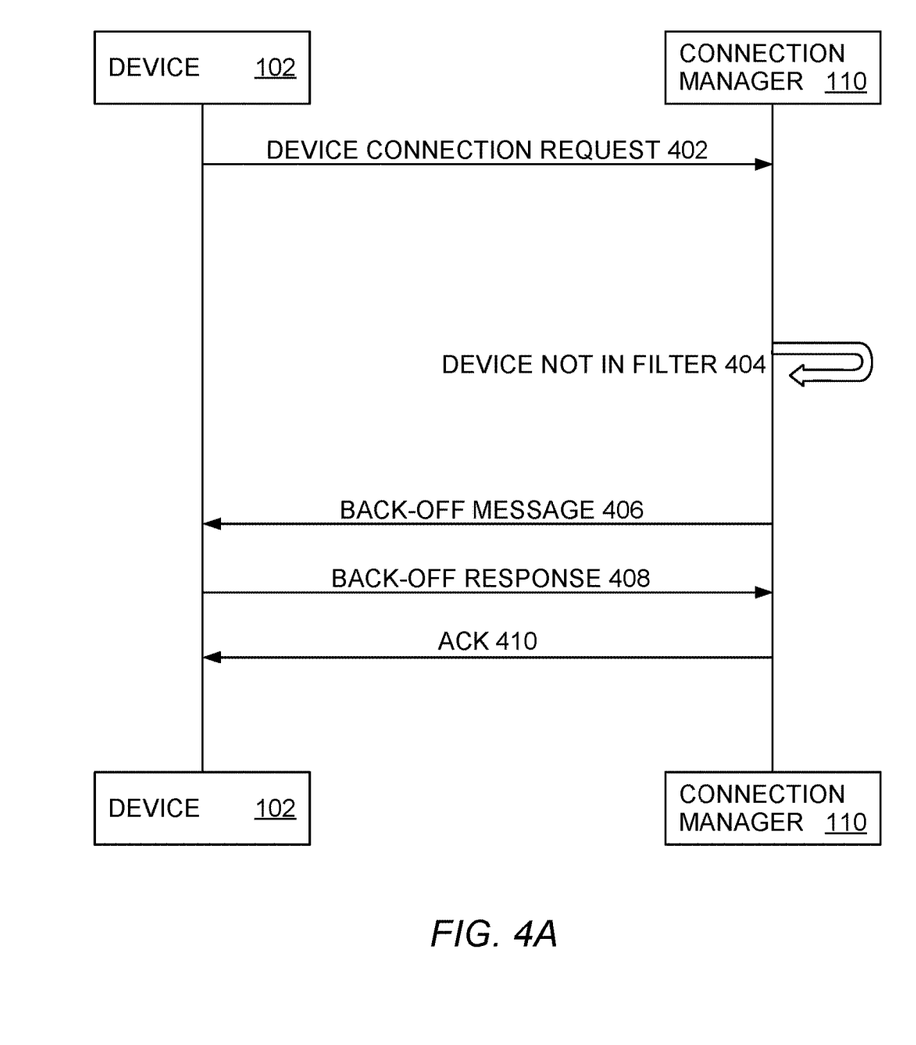
FIGS. 4A-B are messaging diagrams illustrating operation of a connection manager in a further device onboarding environment, according to one embodiment described herein.
Figure 4B:
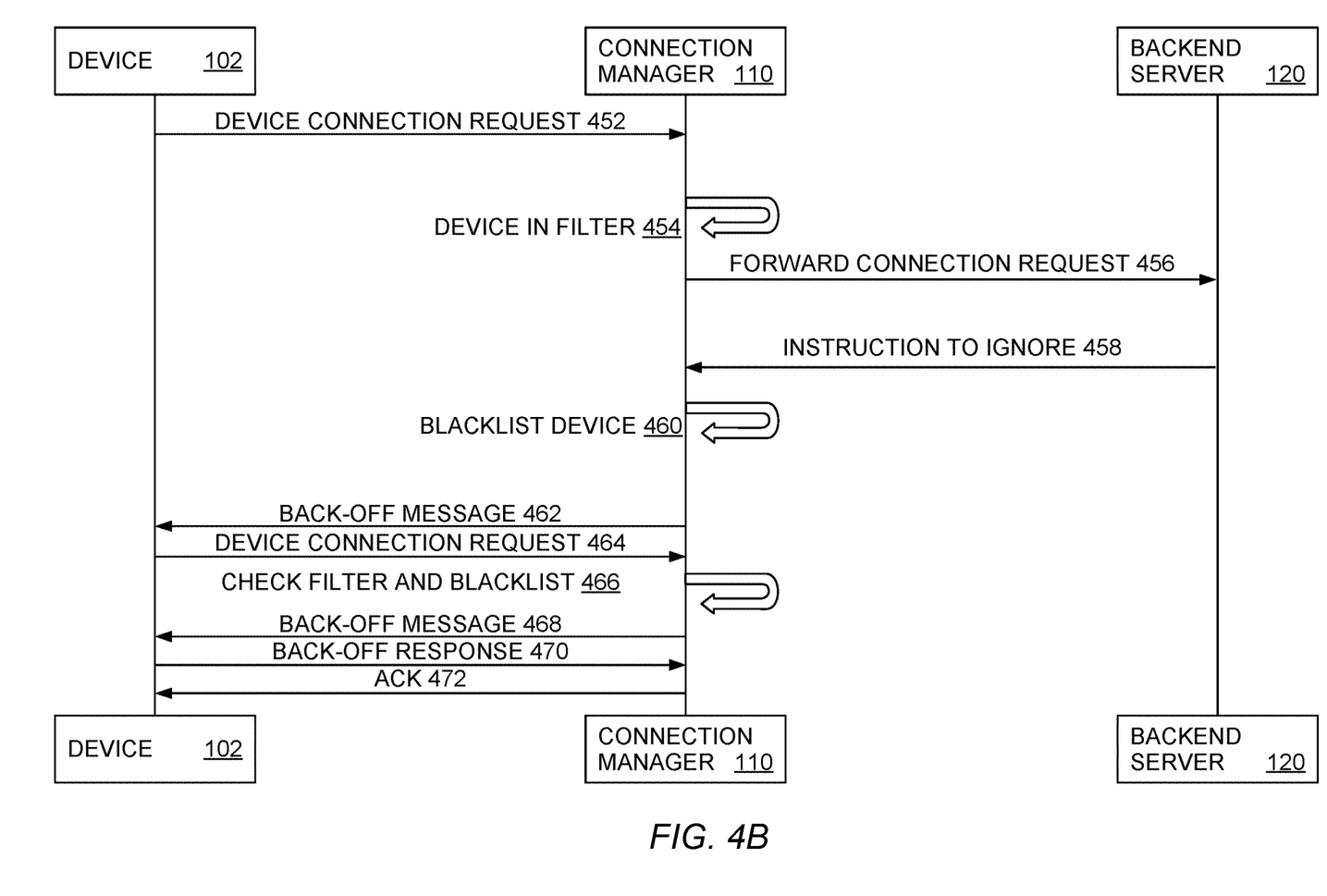

FIGS. 4A-B are messaging diagrams illustrating operation of a connection manager in a further device onboarding environment, according to one embodiment described herein. In an embodiment, FIGS. 4A-B illustrate a device onboarding environment with a connection manager that uses a probabilistic hash filter (e.g., an incremental bloom filter) as described in connection with FIGS. 4-6, below.

In an embodiment, FIG. 4A illustrates messaging when a device 102 is not in the set associated with the filter and is not ready for activation. A device 102 (e.g., one of the devices 102A-N illustrated in FIG. 1) transmits a device connection request 402 to a connection manager 110 (e.g., the connection manager 110 illustrated in FIGS. 1 and 2). In an embodiment, the device connection request 402 is an unsolicited activation request from the device 102. For example, the device connection request 402 can be a PnP activation request (e.g., requesting activation for a PnP device). As another example, the device connection request 402 can be an IoT activation request (e.g., requesting activation for an IoT device).

The connection manager 110, at phase 404, then checks a probabilistic hash filter for the device. In an embodiment, the connection manager 110 includes a probabilistic hash filter (e.g., the filter 214 illustrated in FIG. 2). For example, this can be an incremental Bloom filter, or any other suitable probabilistic data structure. As discussed above, in an embodiment a Bloom filter provides potentially false positive values, but not false negatives.

In an embodiment, the data set associated with the filter has previously been populated with a list of registered devices. This is discussed further with regard to FIG. 5, below. For example, a backend server (e.g., a backend server 120 illustrated in FIG. 1) can provide a list of registered devices to the connection manager for populating the filter. The backend server can then periodically update the connection manager with the list of registered devices.

Thus, the connection manager 110 queries a filter (e.g., an incremental Bloom filter) to see if the device 102 is in the set associated with the filter. In an embodiment, this can be done using an identifier associated with the device 102. This can be a MAC address, an IP address, a serial number, or any other suitable identifier. Because the filter is guaranteed to provide no false positives, the determination by the connection manager 110 that the device is not in the filter is accurate. This indicates that the device 102 is not ready for activation, and the device 102 should back off.

The connection manager 110 then sends a back-off indication (e.g., a back-off message 406) to the device 102. This back-off message 406 indicates to the device 102 that it should back-off and stop attempting to connect for a period of time. In an embodiment, the back-off period is provided in the back-off message 406. Alternatively, the device 102 can determine the back-off period. For example, the device 102 can have a set back-off period, or this can be configured by a user.

The device 102 responds by sending a back-off response 408 to the connection manager 110. This indicates that the device 102 has received the back-off message 406. The connection manager 110 then sends an ack 410 to the device 102.

FIG. 4B illustrates messaging when a device 102 is in the set associated with the filter but is not ready for activation (e.g., a false positive result from the filter). A device 102 (e.g., one of the devices 102A-N illustrated in FIG. 1) transmits a device connection request 452 to a connection manager 110 (e.g., the connection manager 110 illustrated in FIGS. 1 and 2). In an embodiment, the device connection request 452 is an unsolicited activation request from the device 102. For example, the device connection request 452 can be a PnP activation request (e.g., requesting activation for a PnP device). As another example, the device connection request 452 can be an IoT activation request (e.g., requesting activation for an IoT device).

The connection manager 110, at phase 454, then checks a probabilistic hash filter for the device. In an embodiment, the connection manager 110 includes a probabilistic hash filter (e.g., the filter 214 illustrated in FIG. 2). For example, this can be a Bloom filter, or any other suitable probabilistic data structure. As discussed above, in an embodiment a Bloom filter provides false positive values, but not false negatives.

Thus, the connection manager 110 queries a filter (e.g., an incremental Bloom filter) to see if the device 102 is in the set associated with the filter. In an embodiment, this can be done using an identifier associated with the device 102. This can be a MAC address, an IP address, a serial number, or any other suitable identifier. The connection manager 110 determines that the device is in the set associated with the filter, and proceeds with querying the backend server for activation of the device 102.

The connection manager 110 then forwards the connection request 456 to the backend server 120. The backend server 120 determines that the device 102 is not ready for activation (e.g., a user has not yet registered the device 102). The backend server thus returns an instruction to ignore 458 to the connection manager 110.

The connection manager 110 receives the instruction to ignore 458 and, at phase 460, blacklists the device. In an embodiment, as discussed above, the filter can have entries added to its associated set, but cannot have entries removed. That means that a false positive cannot be cured by removing the associated entry from the filter. Instead, the connection manager 110 can maintain a separate blacklist of devices which have had false positives (e.g., non-probabilistic hash filter or another suitable data structure). The connection manager 110 can add the device 102 to this blacklist. Because the number of false positives in the filter is relatively small, this blacklist will be much smaller than the set associated with the filter, and a non-probabilistic data structure is sufficiently fast to query.

This blacklist can then be used with future queries for devices in the filter (e.g., at phase 454 illustrated in FIG. 4B). If a filter query returns an indication that the device 102 is in the filter, the connection manager 110 can then verify that the device is not in the blacklist. If the device is in the blacklist, the connection manager 110 transmits a back-off message to the device. In this way the connection manager 110 can handle repeated requests from a device 102 that is not ready for activation, but for which a query to the filter returns a false positive.

In an embodiment, the blacklist can be periodically cleared or updated. For example, when the set associated with the filter is updated (e.g., as discussed below with regard to FIG. 5), the blacklist can be cleared. Alternatively, the entries in the updated set can be used to update the blacklist (e.g., by removing devices that are now ready for activation). As discussed with regard to FIG. 5, this can be done during off hours or other times when the processing load is relatively light.

After adding the device to the blacklist at phase 460, the connection manager 110 transmits a back-off message 462 to the device 102. The device 102 then transmits a device connection request 464 to the connection manager 110 (e.g., the device 102 does not receive the back-off message, or does not heed the back-off message). In an embodiment, the device connection request 464 is an unsolicited activation request from the device 102. For example, the device connection request 464 can be a PnP activation request (e.g., requesting activation for a PnP device). As another example, the device connection request 464 can be an IoT activation request (e.g., requesting activation for an IoT device).

The connection manager 110 checks both the filter and the blacklist for the device, at phase 466. As discussed above, the filter will likely again return a false positive, but the blacklist will now return a hit. The connection manager 110 then transmits a back-off message 468 to the device 102. The device 102 transmits a back-off response 470 to the connection manager 110. The connection manager 110 transmits an ack 472 to the device 102.

Figure 5:
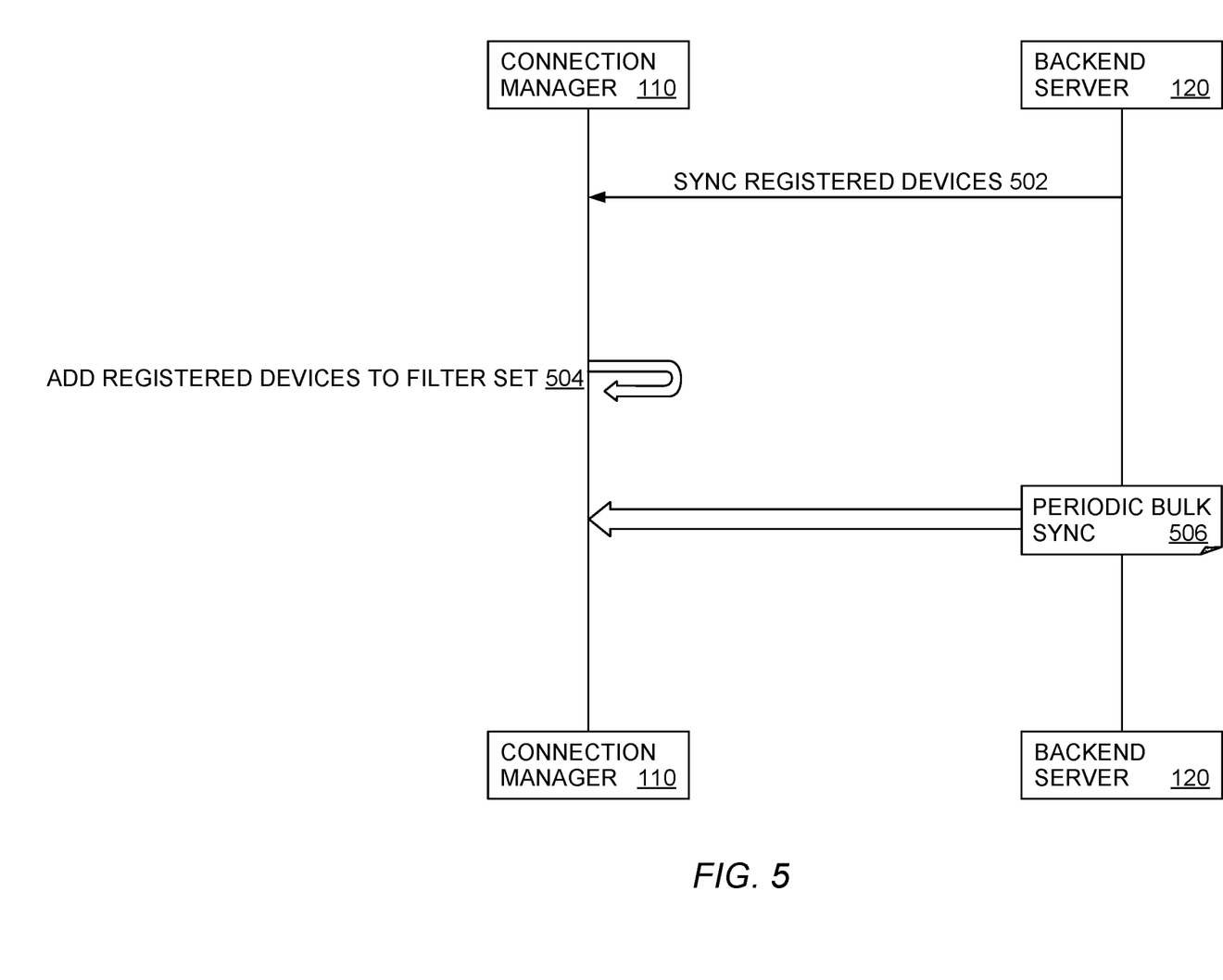
FIG. 5 is a messaging diagram illustrating updating a connection manager filter data set in a device onboarding environment, according to one embodiment described herein.

FIG. 5 is a messaging diagram illustrating updating a connection manager filter data set in a device onboarding environment, according to one embodiment described herein. As discussed above, a filter (e.g., the filter 214 illustrated in FIG. 2) can be used by a connection manager (e.g., the connection manager 110 illustrated in FIGS. 1-2) to screen incoming connection requests. In an embodiment, the data set associated with this filter is periodically updated to provide for accurate screening of incoming connection requests.

A backend server 120 (e.g., one or more of the backend servers 120 illustrated in FIG. 1) transmits a sync registered devices message 502 to a connection manager 110 (e.g., the connection manager 110 illustrated in FIGS. 1 and 2). In an embodiment, the sync registered devices message 502 includes an updated set of devices that are ready for activation. In another embodiment, the sync registered devices message 502 initiates a synchronization and update process by which the connection manager 110 eventually receives the updated set of devices (e.g., following a series of network messages between the connection manager 110 and the backend server 120).

The connection manager 110 then adds the registered devices to the filter set, at phase 504. In an embodiment, as discussed above, a bloom filter or other incremental probabilistic has filter is used by the connection manager 110. In this embodiment, the filter can have entries added to its associated data set, but not removed. The connection manager 110 adds newly registered devices to the filter data set.

The backend server 120 then undertakes periodic bulk sync 506 of the connection manager 110. In an embodiment, the backend server can be configured to update the connection manager 110 on a periodic basis (e.g., every few seconds, minutes, hours, etc.). The length of this period can be configurable by a user, or permanent. Alternatively, the backend server 120 can be configured to update the connection manager at particular times (e.g., at particular times of day). As another alternative, the backend server 120, the connection manager 110, or both, can monitor activity and can initiate update when the connection manager 110 is less busy. This can avoid slow down or delay for customers, during the activation process.

Figure 6:
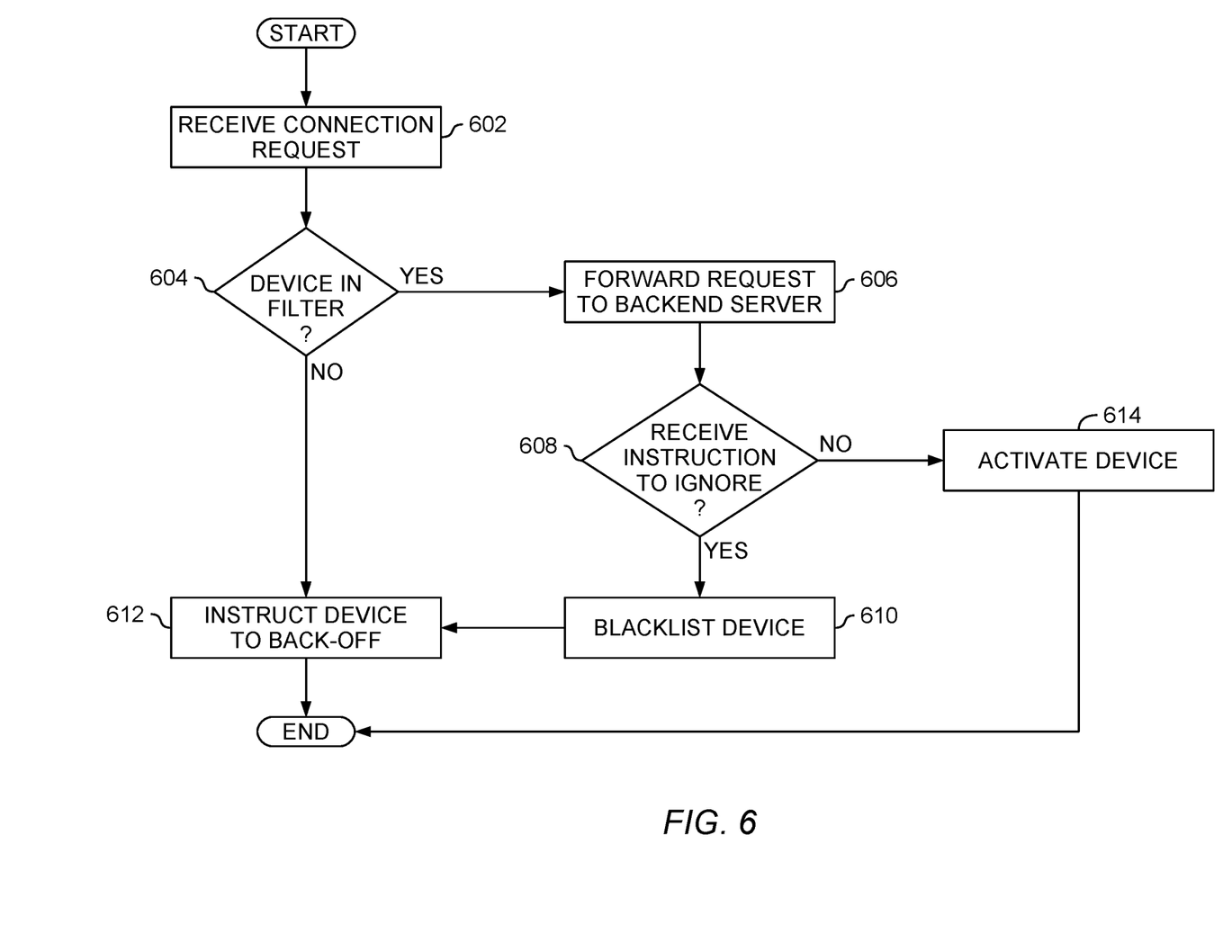
FIG. 6 is a flowchart illustrating operation of a connection manager in a device onboarding environment, according to one embodiment described herein.

FIG. 6 is a flowchart illustrating operation of a connection manager in a device onboarding environment, according to one embodiment described herein. At block 602 a connection manager (e.g., the connection manager 110 illustrated in FIGS. 1 and 2) receives a connection request from a device (e.g., one of the devices 102 illustrated in FIG. 1). In an embodiment, the connection request is an unsolicited activation request from the device. For example, the connection request can be a PnP activation request (e.g., requesting activation for a PnP device). As another example, the connection request can be an IoT activation request (e.g., requesting activation for an IoT device).

At block 604, the connection manager checks whether the device is in the data set associated with a filter. As discussed above, the connection manager can include a filter (e.g., the filter 214 illustrated in FIG. 2) used to determine whether a given device is in a data set.

If the device is in the filter data set, the flow proceeds to block 606. At block 606, the connection manager forwards the connection request to a backend server (e.g., one or more of the backend servers 120 illustrated in FIG. 1). The backend server then determines whether the device is ready for activation. As discussed above with regard to FIGS. 4A-B, if the device is ready for activation the backend server sends to the connection manager a ready for activation message. If the device is not ready for activation, the backend server sends to the connection manager an ignore message.

At block 608, the connection manager receives the message from the backend server. If the message is an instruction to ignore, the flow proceeds to block 610 and the connection manager blacklists the device (e.g., as discussed above in connection with phase 460 in FIG. 4).

The flow then proceeds to block 612 and the connection manager sends a back-off message to the device (e.g., as discussed in connection with back-off messages 406 in FIGS. 4A and 462 in FIG. 4B). Returning to block 608, if the connection manager does not receive an ignore instruction from the backend server (e.g., the connection manager receives a ready for activation message from the backend server), the flow proceeds to block 614.

At block 614, the device is activated. In one embodiment, the backend server transmits to the connection manager a success indication and configuration information for the device. The connection manager then activates the device. Alternatively, the backend server activates the device and transmits a success indication to the connection manager. In an embodiment, after the device is activated the connection manager transmits an indication of completion to the device.

Returning to block 604, if the device seeking connection is not in the filter, the flow proceeds to block 612. As discussed above, at block 612 the connection manager instructs the device to back-off (e.g., as discussed in connection with back-off message 406 in FIG. 4A and back-off message 462 in FIG. 4B).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computerized method for handling requests from a remote device, comprising:
    receiving, at a server, a first unsolicited activation request from a first device of a plurality of devices;
    querying a probabilistic hash filter, associated with a data set, using a first identifier associated with the first device, and in response receiving a first result from the probabilistic hash filter indicating that the first device is not ready for activation;
    in response to receiving the first result, transmitting, to the first device, a back-off indication;
    receiving, at the server, a second activation request from a second device of the plurality of devices;
    querying the probabilistic hash filter, associated with the data set, using a second identifier associated with the second device, and in response receiving a second result from the probabilistic hash filter indicating that the second device is likely ready for activation;
    in response to receiving the second result, forwarding the second activation request to a second server for activation, and in response receiving from the second server a success indication; and
    in response to receiving the success indication, transmitting an indication of completion to the second device.

2. The method of claim 1, wherein the probabilistic hash filter is an incremental bloom filter.

3. The method of claim 2, wherein the first activation request is a plug and play (PnP) activation request for the first device, wherein the second activation request is a PnP activation request for the second device, and wherein the indication of completion is an indication that the PnP activation for the second device is successful.

4. The method of claim 2, wherein the first activation request is an internet of things (IoT) activation request for the first device, wherein the second activation request is an IoT activation request for the second device, and wherein the indication of completion is an indication that the IoT activation for the second device is successful.

5. The method of claim 1, further comprising:
    receiving, at the server, a third activation request from a third device of the plurality of devices;
    querying the probabilistic hash filter, associated with the data set, using a third identifier associated with the third device, and in response receiving a third result from the probabilistic hash filter indicating that the third device is likely ready for activation;
    upon receiving the third result, forwarding the third activation request to the second server for activation, and in response receiving, from the second server, an ignore indication; and
    in response to receiving the ignore indication, adding the third identifier to a blacklist on the server and transmitting, to the third device, a back-off indication.

6. The method of claim 5, further comprising:
    receiving, at the server, a fourth activation request from the third device of the plurality of devices;
    querying the probabilistic hash filter, associated with the data set, using the third identifier associated with the third device, and in response receiving a fourth result from the probabilistic hash filter indicating that the third device is likely ready for activation; and
    determining that the third identifier is included in the blacklist on the server, and in response transmitting, to the third device, a back-off indication.

7. The method of claim 1, further comprising:
    receiving, from the second server, an updated data set; and
    updating the data set associated with the probabilistic hash filter, based on the received updated data set.

8. The method of claim 7, wherein updated data is received at the server from the second server on a periodic basis.

9. The method of claim 1, wherein the probabilistic hash filter runs locally on the server and the data set is stored locally at the server.

10. A system, comprising:
    a processor; and a memory containing computer program code that, when executed by the processor, performs an operation comprising:

receiving, at a server, a first unsolicited activation request from a first device of a plurality of devices;

querying a probabilistic hash filter, associated with a data set, using a first identifier associated with the first device, and in response receiving a first result from the probabilistic hash filter indicating that the first device is not ready for activation;

in response to receiving the first result, transmitting, to the first device, a back-off indication;

receiving, at the server, a second activation request from a second device of the plurality of devices;

querying the probabilistic hash filter, associated with the data set, using a second identifier associated with the second device, and in response receiving a second result from the probabilistic hash filter indicating that the second device is likely ready for activation;

in response to receiving the second result, forwarding the second activation request to a second server for activation, and in response receiving from the second server a success indication; and in response to receiving the success indication, transmitting an indication of completion to the second device.

11. The system of claim 10, wherein the probabilistic hash filter is an incremental bloom filter.

12. The system of claim 11, wherein the first activation request and the second activation request are each either a plug and play (PnP) activation request or an Internet of things (IoT) activation request for the respective device, and wherein the indication of completion is an indication that the activation for the second device is successful.

13. The system of claim 10, the operation further comprising:

receiving, at the server, a third activation request from a third device of the plurality of devices;

querying the probabilistic hash filter, associated with the data set, using a third identifier associated with the third device, and in response receiving a third result from the probabilistic hash filter indicating that the third device is likely ready for activation;

upon receiving the third result, forwarding the third activation request to the second server for activation, and in response receiving, from the second server, an ignore indication; and in response to receiving the ignore indication, adding the third identifier to a blacklist on the server and transmitting, to the third device, a back-off indication.

14. The system of claim 13, the operation further comprising:

receiving, at the server, a fourth activation request from the third device of the plurality of devices;

querying the probabilistic hash filter, associated with the data set, using the third identifier associated with the third device, and in response receiving a fourth result from the probabilistic hash filter indicating that the third device is likely ready for activation; and determining that the third identifier is included in the blacklist on the server, and in response transmitting, to the third device, a back-off indication.

15. A non-transitory computer-readable medium containing computer program code that, when executed by operation of one or more computer processors, performs an operation comprising:

receiving, at a server, a first unsolicited activation request from a first device of a plurality of devices;

querying a probabilistic hash filter, associated with a data set, using a first identifier associated with the first device, and in response receiving a first result from the probabilistic hash filter indicating that the first device is not ready for activation;

in response to receiving the first result, transmitting, to the first device, a back-off indication;

receiving, at the server, a second activation request from a second device of the plurality of devices;

querying the probabilistic hash filter, associated with the data set, using a second identifier associated with the second device, and in response receiving a second result from the probabilistic hash filter indicating that the second device is likely ready for activation;

in response to receiving the second result, forwarding the second activation request to a second server for activation, and in response receiving from the second server a success indication; and in response to receiving the success indication, transmitting an indication of completion to the second device.

16. The non-transitory computer-readable medium of claim 15, wherein the probabilistic hash filter is an incremental bloom filter.

17. The non-transitory computer-readable medium of claim 15, the operation further comprising:

receiving, at the server, a third activation request from a third device of the plurality of devices;

querying the probabilistic hash filter, associated with the data set, using a third identifier associated with the third device, and in response receiving a third result from the probabilistic hash filter indicating that the third device is likely ready for activation;

upon receiving the third result, forwarding the third activation request to the second server for activation, and in response receiving, from the second server, an ignore indication;

in response to receiving the ignore indication, adding the third identifier to a blacklist on the server and transmitting, to the third device, a back-off indication;

receiving, at the server, a fourth activation request from the third device of the plurality of devices;

querying the probabilistic hash filter, associated with the data set, using the third identifier associated with the third device, and in response receiving a fourth result from the probabilistic hash filter indicating that the third device is likely ready for activation; and determining that the third identifier is included in the blacklist on the server, and in response transmitting, to the third device, a back-off indication.

* * * * *